(12) United States Patent
Kato

(10) Patent No.: US 12,731,997 B2
(45) Date of Patent: Sep. 8, 2026

(54) ELECTRIC POWER MANAGEMENT SYSTEM AND NON-TRANSITORY RECORDING MEDIUM

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 397 days.

(21) Appl. No.: 18/506,946

(22) Filed: Nov. 10, 2023

(65) Prior Publication Data

US 2024/0170968 A1 May 23, 2024

(30) Foreign Application Priority Data

Nov. 18, 2022 (JP) ................................ 2022-184660

(51) Int. Cl.
*H02J 3/32* (2026.01)
*B60L 53/62* (2019.01)
*B60L 53/68* (2019.01)

(52) U.S. Cl.
CPC .............. *H02J 3/322* (2020.01); *B60L 53/62* (2019.02); *B60L 53/68* (2019.02)

(58) Field of Classification Search
CPC .. H02J 3/322; H02J 13/10; H02J 13/12; H02J 13/1331; H02J 13/16; B60L 53/62;
(Continued)

(56) References Cited

U.S. PATENT DOCUMENTS

2012/0265362 A1* 10/2012 Yasko .................... B60L 53/66 320/155
2015/0283912 A1* 10/2015 Shimizu ................. B60L 55/00 320/157

(Continued)

FOREIGN PATENT DOCUMENTS

JP 2011-151896 A 8/2011
JP 2020-036501 A 3/2020

(Continued)

OTHER PUBLICATIONS

Office Action issued on May 19, 2026 in the corresponding Japanese Patent Application No. 2022-184660, w/ English Translation.

*Primary Examiner* — Zhipeng Wang
(74) *Attorney, Agent, or Firm* — Rimon P.C.

(57) ABSTRACT

An electric power management system includes a processor. The processor is configured to, when an electric power shortage situation improves, cancel a vehicle-to-home electric power feeding state of a vehicle and a vehicle-to-home apparatus and cause the vehicle and the vehicle-to-home apparatus to transition to a charging suppression state. The vehicle-to-home electric power feeding state is established in accordance with an electric power saving request. The charging suppression state is a state in which charging of the vehicle is suppressed. The processor is configured to, when the electric power shortage situation changes to a chargeable situation, cancel the charging suppression state and cause the charging of the vehicle with electric power from the vehicle-to-home apparatus to start.

10 Claims, 6 Drawing Sheets

(58) Field of Classification Search
CPC ........ B60L 53/68; B60L 53/305; B60L 53/63; B60L 53/66; B60L 55/00; B60L 58/12; B60L 53/00; B60L 53/60
See application file for complete search history.

(56) References Cited

U.S. PATENT DOCUMENTS

| | | | | |
|---|---|---|---|---|
| 2018/0201148 | A1* | 7/2018 | Donnelly | B60L 53/36 |
| 2021/0296926 | A1* | 9/2021 | Eleftheriadis | H02J 9/061 |
| 2021/0339647 | A1* | 11/2021 | Batir | B60L 53/51 |
| 2022/0234467 | A1 | 7/2022 | Nakamura | |
| 2023/0024900 | A1* | 1/2023 | Ayoola | B60L 55/00 |

FOREIGN PATENT DOCUMENTS

| | | | |
|---|---|---|---|
| JP | 2020-052732 | A | 4/2020 |
| JP | 2022-115361 | A | 8/2022 |

* cited by examiner

ELECTRIC POWER MANAGEMENT SYSTEM AND NON-TRANSITORY RECORDING MEDIUM

CROSS-REFERENCE TO RELATED APPLICATIONS

The present application claims priority from Japanese Patent Application No. 2022-184660 filed on Nov. 18, 2022, the entire contents of which are hereby incorporated by reference.

BACKGROUND

The disclosure relates to an electric power management system for a vehicle and a non-transitory recording medium that each allow for charging of the vehicle configured to travel by electric power.

Recently, electric vehicles (EVs) have been widely used in Europe, and the number of EVs is increasing also in Japan. In Europe, sales of battery electric vehicles (BEVs) alone account for 10% or more of the whole vehicle sales. The BEVs are vehicles that use no gasoline. Meanwhile, in these days, a margin of electric power between supply and demand is decreasing, for example, because some electric power plants are not able to operate. This causes shortage of electric power and electric power supply companies and the government more often request electric power saving.

Among EVs, BEVs and plug-in hybrid electric vehicles (PHEVs) are configured to be charged at a place such as the owner's home. Upon such charging, several kilowatts of electric power is used per vehicle. Therefore, if many vehicles are charged in a time zone in which electric power shortage is caused, the amount of used electric power increases and blackout can occur in a large region.

Japanese Unexamined Patent Application Publication (JP-A) No. 2020-036501 discloses a charging system that, in order to deal with electric power shortage, puts off starting of external charging until the electric power shortage of an electric power system is resolved. Such a charging system helps to prevent shortage of electric power from the external electric power system from becoming worse due to the external charging.

SUMMARY

An aspect of the disclosure provides an electric power management system that includes a processor. The processor is configured to, when an electric power shortage situation improves, cancel a vehicle-to-home electric power feeding state of a vehicle and a vehicle-to-home apparatus and cause the vehicle and the vehicle-to-home apparatus to transition to a charging suppression state. The vehicle-to-home electric power feeding state is established in accordance with an electric power saving request. The charging suppression state is a state in which charging of the vehicle is suppressed. The processor is configured to, when the electric power shortage situation changes to a chargeable situation, cancel the charging suppression state and cause the charging of the vehicle with electric power from the vehicle-to-home apparatus to start.

An aspect of the disclosure provides a non-transitory tangible computer-readable recording medium containing a program. The program causes, when executed by a computer, the computer to implement a method. The method includes: canceling, when an electric power shortage situation improves, a vehicle-to-home electric power feeding state of a vehicle and a vehicle-to-home apparatus and causing the vehicle and the vehicle-to-home apparatus to transition to a charging suppression state, the vehicle-to-home electric power feeding state being established in accordance with an electric power saving request, the charging suppression state being a state in which charging of the vehicle is suppressed; and canceling, when the electric power shortage situation changes to a chargeable situation, the charging suppression state and causing the charging of the vehicle with electric power from the vehicle-to-home apparatus to start.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
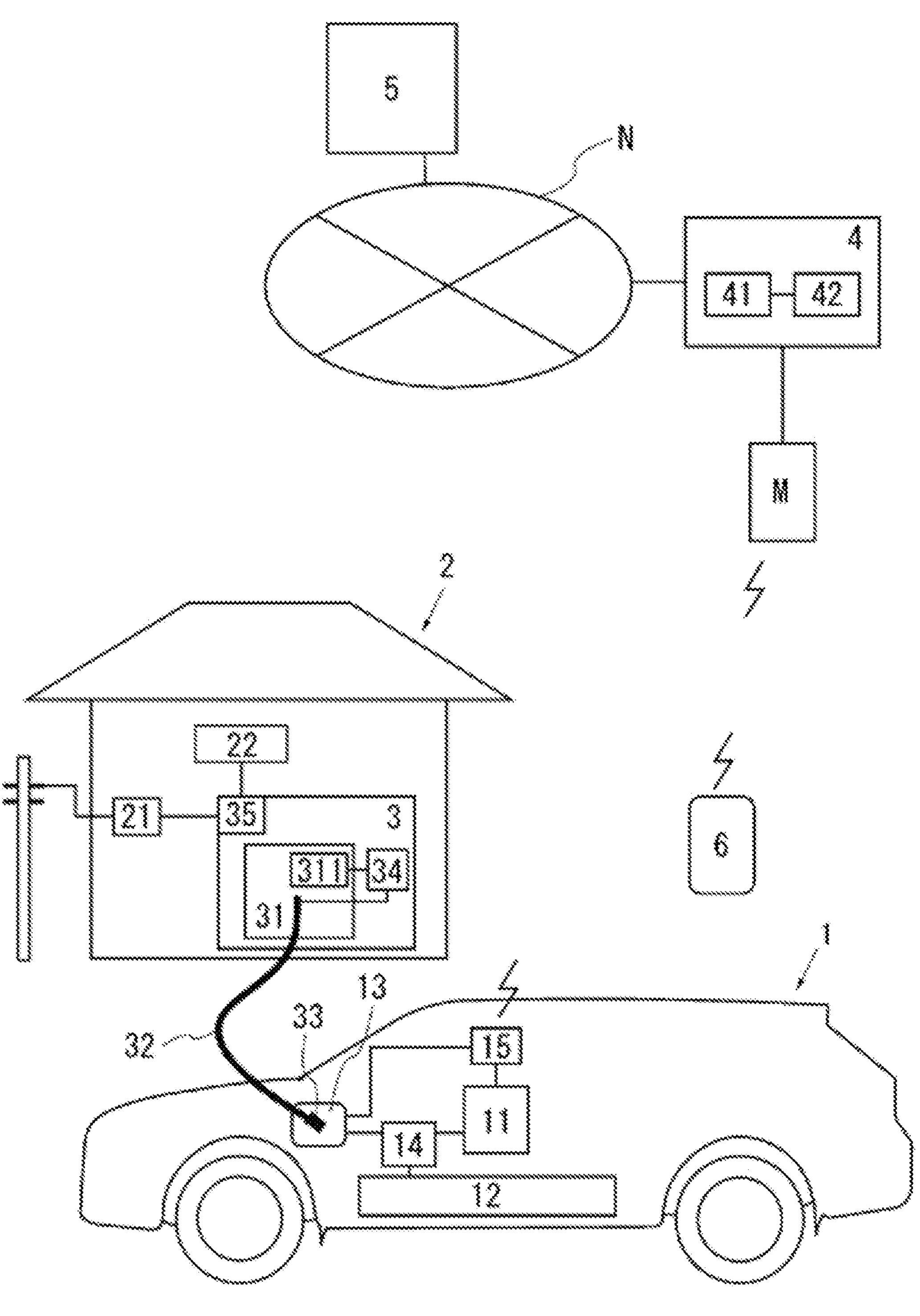
FIG. 1 is a diagram illustrating a charging system according to one example embodiment of the disclosure.

It is expected that the number of vehicles to be charged at a place such as the owner's home will continue to increase. When an electric power shortage situation is caused, performing vehicle-to-home electric power feeding helps to reduce electric power supply to homes. When the electric power shortage situation is caused, it is expected that many vehicles performing vehicle-to-home electric power feeding improves the electric power shortage situation. However, when the electric power shortage situation improves, many vehicle-to-home apparatuses start charging vehicles at once. This can rapidly increase the amount of electric power supply and can lead to blackout in a large region.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Controls by components including, without limitation, a processor of any of the following example embodiments of the disclosure may be implemented by a computer system and a software. The computer system may include a central processing unit (CPU). The software may be stored in a storage.

First Example Embodiment

FIG. 1 illustrates a charging system including an electric power management system according to a first example embodiment of the disclosure. A description is omitted regarding a configuration of electric power feeding from an electric power plant to each home via a substation. The charging system of the first example embodiment may be adapted to vehicle-to-home electric power feeding. A vehicle 1 illustrated in FIG. 1 may be adapted to the vehicle-to-home electric power feeding. The vehicle 1 may be coupled to a vehicle-to-home apparatus 3. The vehicle-to-home apparatus 3 may be provided in a house 2. The vehicle-to-home apparatus 3 may be a charging apparatus adapted to the vehicle-to-home electric power feeding. A server 4 may be communicably coupled to an electric power company system 5 via a network N. The server 4 may also be wirelessly and communicably coupled to the vehicle 1 and a mobile terminal 6 via a mobile body communication system M. Non-limiting examples of the mobile terminal 6 may include a smartphone. The server 4 may include a processor 41 and a recording medium 42. In one embodiment, the processor 41 may serve as a “processor”.

The electric power management system of the first example embodiment may be provided in the server 4. The server 4 of the first example embodiment may be run by an original equipment manufacturer (OEM) that has manufactured the vehicle 1. However, alternatively, the server 4 may be run by any other organization such as an electric power company or a vehicle industry association.

The vehicle 1 may be an electric vehicle that travels by electric power stored in a battery 12. Electric power may be supplied from a charging and feeding port 13 to the battery 12 via a vehicle charger and feeder 14, and may be fed from the battery 12 to the house 2 by the vehicle-to-home electric power feeding. The processor 11 may communicate with the vehicle-to-home apparatus 3 via the charging and feeding port 13 in a wired manner. The vehicle charger and feeder 14 may be controlled by the processor 11. The vehicle 1 may include a vehicle communicator 15. The vehicle communicator 15 may be configured to communicate with the vehicle-to-home apparatus 3 in a wired manner. The vehicle communicator 15 may be coupled to the server 4 wirelessly via the mobile body communication system M.

The vehicle-to-home apparatus 3 may be coupled between a wattmeter 21 and a distribution board 22, and may be couplable to the vehicle 1. The wattmeter 21 and the distribution board 22 may be provided in the house 2. In FIG. 1, the vehicle-to-home apparatus 3 may be coupled to the vehicle 1. The vehicle-to-home apparatus 3 may include a charger and feeder 31, a charging and feeding cable 32, a vehicle connector 33, and a communicator 34. The charging and feeding cable 32 may be coupled to the charger and feeder 31. The vehicle connector 33 may be provided at a leading end of the charging and feeding cable 32. The communicator 34 may perform communication with the vehicle 1. In addition, a vehicle-to-home switching board 35 may be coupled between the wattmeter 21 and the distribution board 22. The vehicle-to-home switching board 35 may switch electric power to be supplied to the distribution board 22 between electric power from the wattmeter 21 and electric power from the charger and feeder 31. The charger and feeder 31 may include a processor 311. The processor 311 may control an operation of the charger and feeder 31.

The vehicle connector 33 of the vehicle-to-home apparatus 3 may be coupled to the charging and feeding port 13 of the vehicle 1. This may allow for charging of the battery 12 with electric power supplied from the charger and feeder 31 via the charging and feeding cable 32 and the vehicle charger and feeder 14. Electric power may be supplied to the charger and feeder 31 from the wattmeter 21 via the vehicle-to-home switching board 35. Electric power may also be supplied from the battery 12 of the vehicle 1 to the distribution board 22 of the house 2 via the vehicle charger and feeder 14 and the vehicle-to-home apparatus 3 to allow for the vehicle-to-home electric power feeding. The charging and feeding cable 32 may contain an electric power line for electric power transmission, and a communication cable. This may allow for communication between the communicator 34 of the vehicle-to-home apparatus 3 and the vehicle communicator 15 of the vehicle 1 via the vehicle connector 33 and the charging and feeding port 13.

The electric power company system 5 may send an electric power saving request via the network N. The server 4 may receive the electric power saving request from the network N, may create information such as an instruction for vehicle electric power management, and may send the created information to the vehicle 1 via the mobile body communication system M. The mobile body communication system M may be a communication system provided by a mobile body communication company.

In one embodiment, the server 4 in the first example embodiment may serve as an “electric power management system” for a vehicle. The server 4 may include the recording medium 42 that is computer readable and holds a program to allow for execution of electric power management for a vehicle. Based on the program, the processor 41 may perform electric power management for a vehicle. The recording medium 42 may be non-transitory and tangible. The recording medium 42 may be a component detachable from the server 4, such as a universal serial bus (USB) memory.

Now, a description is provided of a flow of the vehicle electric power management according to the first example embodiment. Described first is a process of performing the vehicle-to-home electric power feeding from the vehicle 1 to the house 2 when electric power shortage is caused. Described thereafter are a process of ending the vehicle-to-home electric power feeding when the electric power shortage improves, and a process of starting charging of the vehicle 1. A control in each step may be implemented by the processor 41 performing a process based on the program stored in the recording medium 42. The processor 41 may be the CPU. The program may be storable in a computer-readable recording medium.

The electric power company system 5 and the server 4 may transmit information to and receive information from each other via the network N. The server 4 may be coupled to the mobile body communication system M of the mobile body communication company. The network N in the first example embodiment may be the Internet. The server 4 may wirelessly communicate with the vehicle 1 by means of the mobile body communication system M. The vehicle 1 may perform such communication by means of the vehicle communicator 15. The server 4 may also wirelessly communicate with the mobile terminal 6 by means of the mobile body communication system M. The vehicle 1 and the vehicle-to-home apparatus 3 may transmit information to and receive information from each other via the communication cable contained in the charging and feeding cable 32.

[Process of Performing Vehicle-to-Home Electric Power Feeding when Electric Power Shortage is Caused]

Figure 2:
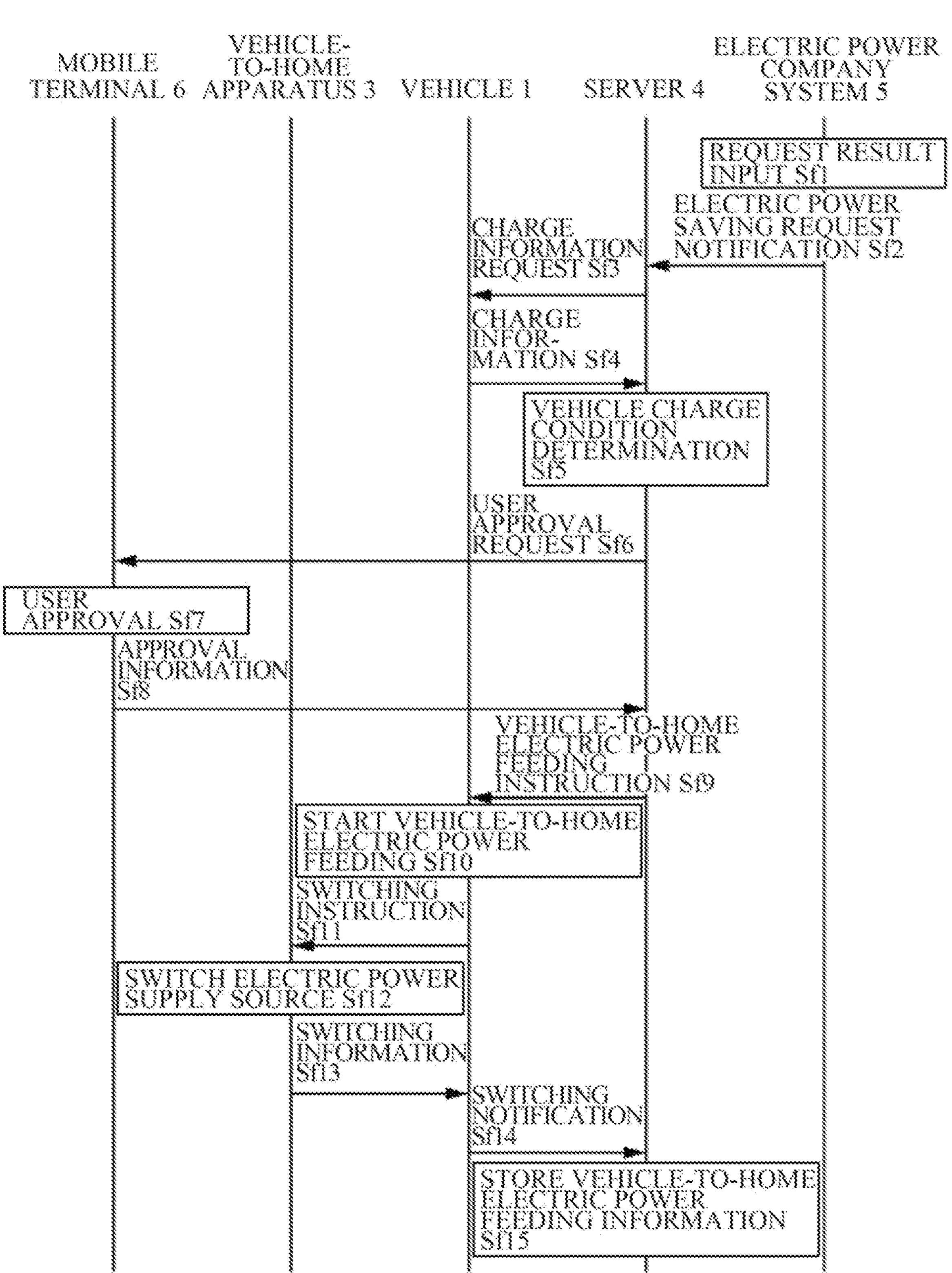
FIG. 2 is a diagram illustrating a process of vehicle-to-home electric power feeding in an electric power shortage situation according to one example embodiment.

When electric power shortage is caused, it is expected that switching an electric power supply source of the distribution board 22 of the house 2 from a commercial electric power supply source to the vehicle-to-home electric power feeding may create a margin in electric power supplied by the electric power company. FIG. 2 illustrates a process of performing the vehicle-to-home electric power feeding when electric power shortage is caused.

[Process of Making Electric Power Saving Request]

In the first example embodiment, when electric power shortage is caused, the electric power company may issue an electric power shortage warning or an electric power shortage advisory, and may determine whether to request cooperation for electric power saving by a vehicle management system. For example, if the electric power company estimates that an electric power reserve margin is to be less than 3%, the electric power company may issue the electric power shortage warning. For example, if the electric power company estimates that the electric power reserve margin is to fall within a range from 3% to 5% both inclusive, the electric power company may issue the electric power shortage advisory. In both the case where the electric power company issues the electric power shortage warning and the case where the electric power company issues the electric power shortage advisory, the electric power company may determine whether to request cooperation for electric power saving by a vehicle management system. If the electric power company determines to request cooperation, such a result of determination may be supplied to the electric power company system 5 (step Sf1). The electric power company system 5 may send an electric power saving request notification to the server 4 (step Sf2).

[Process of Determining Whether Vehicle-to-Home Electric Power Feeding is Performable]

When receiving the electric power saving request notification, the server 4 may acquire information regarding a charge condition of the vehicle 1 to perform the vehicle-to-home electric power feeding. To acquire the information regarding the charged condition of the vehicle 1, the server 4 may send a charge information request to the vehicle 1 (step Sf3). Multiple vehicles 1 may be registered in the server 4 as targets in advance. The more vehicles 1 are registered, the greater margin may be created in the electric power supplied by the electric power company.

The vehicle 1 having received the charge information request may send charge information to the server 4 (step Sf4). The charge information may indicate whether the charging and feeding cable 32 is being coupled to the vehicle connector 33 and whether a charged rate of the battery 12 is higher than SOC. The SOC may be a discharge lower limit that is set to inhibit the vehicle-to-home electric power feeding when the charged rate is lower than or equal to the SOC. Typically, the SOC may be set by a user of the vehicle 1.

In the server 4 having received the charge information, the processor 41 may perform a vehicle charge condition determination (step Sf5). If the charging and feeding cable 32 is not coupled to the vehicle connector 33, it may be difficult to perform the vehicle-to-home electric power feeding. If the charged rate of the battery 12 is not higher than the SOC, the vehicle-to-home electric power feeding may not be performed because a decrease in the charged rate is not favorable. If the charging and feeding cable 32 is coupled to the vehicle connector 33 and the charged rate of the battery 12 is higher than the SOC, the processor 41 may determine that the vehicle-to-home electric power feeding is performable. If the charging and feeding cable 32 is not coupled to the vehicle connector 33 or if the charged rate of the battery 12 is not higher than the SOC, the process may be ended. Although, in the first example embodiment, the vehicle-to-home electric power feeding may be determined as performable when the charged rate is higher than the SOC, in one example, the vehicle-to-home electric power feeding may be determined as performable when the charged rate is higher than the SOC by a predetermined value.

[Process of Approving Vehicle-to-Home Electric Power Feeding]

When determining that the vehicle-to-home electric power feeding is performable, the server 4 may request approval of the vehicle-to-home electric power feeding from the user of the vehicle 1. To request such approval, the server 4 may send a user approval request to the mobile terminal 6 belonging to the user (step Sf6). The server 4 may hold information regarding the mobile terminal 6 in association with information regarding the vehicle 1. The mobile terminal 6 may display information indicating that the electric power company has made the electric power saving request because of the electric power shortage, and information requesting the approval of the vehicle-to-home electric power feeding. When the user approves the vehicle-to-home electric power feeding on the mobile terminal 6 (step Sf7), approval information may be sent (step Sf8).

[Process of Starting Vehicle-to-Home Electric Power Feeding]

When receiving the approval information, the server 4 may give an instruction regarding the vehicle-to-home electric power feeding to the vehicle 1 (step Sf9). The vehicle 1 having received the instruction regarding the vehicle-to-home electric power feeding may start the vehicle-to-home electric power feeding (step Sf10). At this time, the instruction regarding the vehicle-to-home electric power feeding given from the server 4 may include information indicating that an electric power saving request has been made. The vehicle 1 may store information that a vehicle-to-home electric power feeding state is established in accordance with the electric power saving request. The vehicle 1 may send a switching instruction to the vehicle-to-home apparatus 3 (step Sf11). The vehicle-to-home apparatus 3 having received the switching instruction may perform electric power supply source switching at the vehicle-to-home switching board 35 (step Sf12). In the electric power supply source switching, a source of electric power supply to the distribution board 22 may be switched from the commercial electric power source used via the wattmeter 21 to the vehicle-to-home electric power feeding from the charger and feeder 31. The vehicle-to-home electric power feeding may be performed by converting electric power supplied from the battery 12 of the vehicle 1 into an alternating current having an appropriate voltage by the vehicle-to-home apparatus 3 and supplying the alternating current to the distribution board 22. When the switching by the vehicle-to-home apparatus 3 ends and the vehicle-to-home electric power feeding state is established, the vehicle-to-home apparatus 3 may send switching information to the vehicle 1 (step Sf13). The switching information may indicate that the switching has been completed. The vehicle 1 having received the switching information may send a switching notification to the server 4 (step Sf14). The server 4 having received the switching notification may store a vehicle ID and a starting time of the vehicle-to-home electric power feeding as vehicle-to-home electric power feeding information (step Sf15).

[Regarding End of Vehicle-to-Home Electric Power Feeding]

When the vehicle connector 33 is detached from the charging and feeding port 13 while the vehicle-to-home electric power feeding is performed, the vehicle-to-home electric power feeding may end, and the distribution board 22 may use the commercial electric power supply via the wattmeter 21 as the electric power supply source. When the charged rate of the battery 12 decreases down to the SOC also, the vehicle-to-home electric power feeding may end. When the vehicle-to-home electric power feeding ends, storing of the information indicating that the vehicle-to-home electric power feeding state is established in accordance with the electric power saving request may be canceled. In addition, the vehicle 1 may notify the server 4 that the vehicle-to-home electric power feeding has ended. This may allow the server 4 to hold information regarding the vehicle-to-home electric power feeding situation established in accordance with the electric power saving request.

[Process of Ending Vehicle-to-Home Electric Power Feeding Because of Improvement in Electric Power Shortage Situation]

Figure 3:
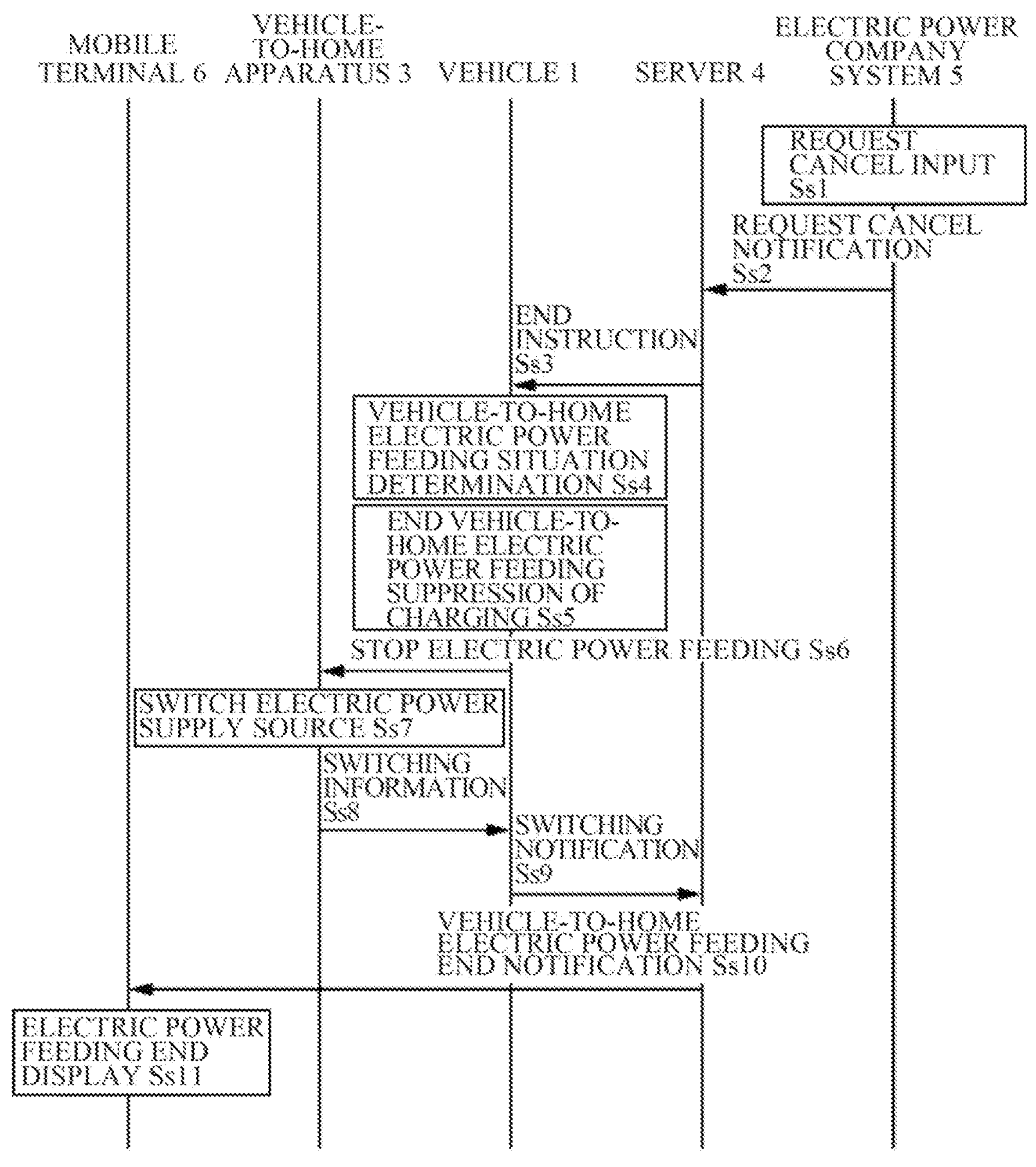
FIG. 3 is a diagram illustrating a process of ending the vehicle-to-home electric power feeding according to one example embodiment.

When the electric power shortage situation improves, the electric power company may cancel the electric power saving request. Accordingly, the vehicle 1 and the vehicle-to-home apparatus 3 may cancel the vehicle-to-home electric power feeding state. FIG. 3 illustrates a process of ending the vehicle-to-home electric power feeding because of an improvement in the electric power shortage situation.

[Process of Canceling Electric Power Saving Request]

In the first example embodiment, the electric power company may issue the electric power shortage warning when the electric power reserve margin is estimated to be less than 3%, and may issue the electric power shortage advisory when the electric power reserve margin is estimated to fall within the range from 3% to 5% both inclusive. When the electric power shortage situation improves from the situation in which the electric power shortage warning or the electric power shortage advisory is issued, the electric power company may determine whether to cancel the electric power saving request. If the electric power company determines to cancel the electric power saving request, the electric power company may supply information indicating canceling of the electric power saving request to the electric power company system 5 (step Ss1). When receiving the information indicating the canceling of the electric power saving request, the electric power company system 5 may send a request cancel notification to the server 4 (step Ss2). When receiving the request cancel notification, the server 4 may send, to the vehicle 1, an instruction to end the vehicle-to-home electric power feeding (step Ss3).

[Process of Ending Vehicle-to-Home Electric Power Feeding]

When receiving the instruction to end the vehicle-to-home electric power feeding, the vehicle 1 may perform a vehicle-to-home electric power feeding situation determination (step Ss4). In the vehicle-to-home electric power feeding situation determination, if the vehicle-to-home electric power feeding state is established in accordance with the electric power saving request, the vehicle-to-home electric power feeding may be ended, and a charging suppression state may be established (step Ss5). In the charging suppression state, charging of the battery 12 of the vehicle 1 may not be performed. If the vehicle-to-home electric power feeding state is established but not in accordance with the electric power saving request, the vehicle-to-home electric power feeding may not be ended. If the vehicle-to-home electric power feeding has already been ended, for example, by the user detaching the vehicle connector 33 from the charging and feeding port 13, the vehicle-to-home electric power feeding state may not be established in accordance with the electric power saving request, and therefore, an operation of ending the vehicle-to-home electric power feeding may not be performed.

When the vehicle-to-home electric power feeding ends, electric power feeding from the vehicle 1 to the vehicle-to-home apparatus 3 may stop (step Ss6). When the electric power feeding from the vehicle 1 stops, the vehicle-to-home apparatus 3 may switch the electric power supply source of the distribution board 22 from the battery 12 of the vehicle 1 to the commercial electric power supply source used via the wattmeter 21 (step Ss7). In addition, the vehicle-to-home apparatus 3 may send the switching information to the vehicle 1 (step Ss8). Note that when the vehicle-to-home electric power feeding is ended, for example, by the user detaching the vehicle connector 33 from the charging and feeding port 13, and thereafter the vehicle connector 33 is recoupled to the charging and feeding port 13, storing of the information indicating that the vehicle-to-home electric power feeding state is established in accordance with the electric power saving request may have been canceled already, and the vehicle-to-home electric power feeding may be performed not in accordance with the electric power saving request.

The vehicle 1 having received the switching information may send the switching notification to the server 4 (step Ss9). The server 4 having received the switching notification may send a vehicle-to-home electric power feeding end notification to the mobile terminal 6 (step Ss10). The mobile terminal 6 having received the vehicle-to-home electric power feeding end notification may display information indicating that the vehicle-to-home electric power feeding has ended because of the electric power company canceling the electric power saving request (step Ss11). The mobile terminal 6 may thus notify the user that the vehicle-to-home electric power feeding has ended because the electric power company has canceled the electric power saving request.

In the first example embodiment, the vehicle-to-home electric power feeding may be ended when the electric power saving request is canceled, but charging of the vehicle 1 may not be started immediately. When the electric power saving request is canceled, the vehicle 1 and the vehicle-to-home apparatus 3 may be in the charging suppression state in which charging of the battery 12 of the vehicle 1 is not performed. Canceling of the charging suppression state may be performed in a process of starting charging of a vehicle to be described below.

[Process of Starting Charging of Vehicle]

Figure 4:
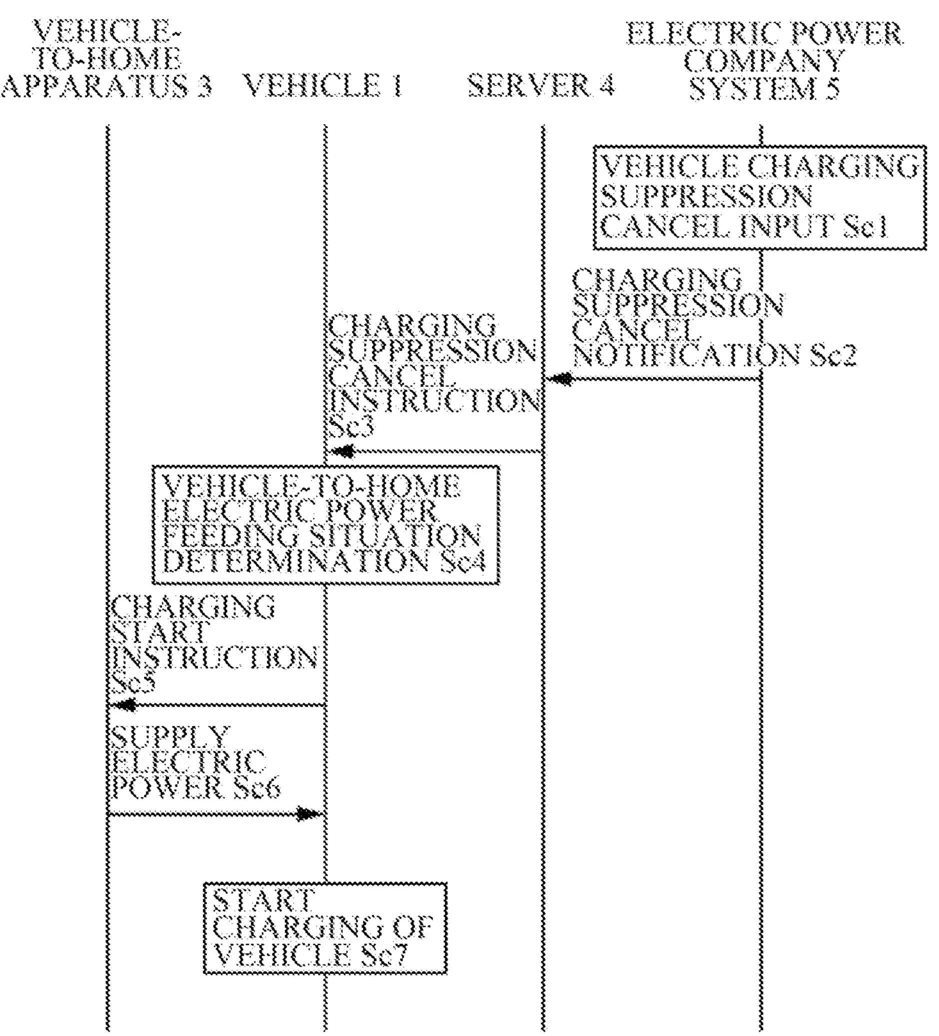
FIG. 4 is a diagram illustrating a process of starting charging of a vehicle according to one example embodiment.

If the electric power saving request is canceled, and thereafter, the electric power situation further improves and a chargeable situation is established, the state of suppressing charging of the vehicle may be canceled, and charging of the vehicle 1 with the electric power from the vehicle-to-home apparatus 3 may be started. FIG. 4 illustrates a process of starting the charging of a vehicle.

[Process of Canceling Suppression of Charging of Vehicle]

When the electric power shortage situation improves, the electric power company may determine whether the chargeable situation is established based on whether the electric power reserve margin is greater than or equal to a threshold. Such a threshold may be a value greater than an electric power reserve margin at a time when the electric power saving request is canceled. The threshold may be set to an electric power reserve margin that does not cause the electric power reserve margin in the electric power shortage situation to be the electric power reserve margin corresponding to the electric power shortage advisory even if charging of the vehicle 1 with the electric power from the vehicle-to-home apparatus 3 is performed at many locations. If it is determined that the chargeable situation is established, information indicating canceling of the vehicle charging suppression may be supplied to the electric power company system 5 (step Sc1). If the result indicates canceling of the suppression of the charging of the vehicle, the electric power company system 5 may send a charging suppression cancel notification to the server 4 (step Sc2). The server 4 having received the charging suppression cancel notification indicating that the electric power shortage situation has changed to the chargeable situation may send, to the vehicle 1, an instruction to cancel the suppression (step Sc3).

[Process of Starting Charging of Vehicle]

The vehicle 1 having received the instruction to cancel the suppression may perform the vehicle-to-home electric power feeding situation determination (step Sc4). In the vehicle-to-home electric power feeding situation determination, if the charging suppression state is established, the charging suppression state may be canceled. In addition, a determination may be performed as to whether the vehicle connector 33 is coupled to the charging and feeding port 13 and charging of the vehicle 1 is to be performed. If the vehicle connector 33 is coupled to the charging and feeding port 13 and the charging of the vehicle 1 is to be performed, an instruction to start charging may be sent to the vehicle-to-home apparatus 3 (step Sc5). The vehicle-to-home apparatus 3 having received the instruction to start charging may supply electric power to the vehicle 1 (step Sc6). In the vehicle 1 receiving the electric power supply, charging of the battery 12 of the vehicle 1 may start (step Sc7).

[Modifications]

In the example embodiment described above, pieces of information regarding the electric power saving request, the canceling of the request, and the canceling of the suppression of the charging may be sent from the electric power company system 5 to the server 4 via the network N. However, in one example, the electric power company may notify an administrator of the server 4 of the electric power saving request, etc. by telephone, facsimile, e-mail, or any other method, and the administrator may input the information to the server 4 to send an instruction regarding the vehicle-to-home electric power feeding, the instruction to end the vehicle-to-home electric power feeding, the instruction to cancel the suppression of the charging, or any other instruction to the vehicle 1 or the mobile terminal 6.

In one example, when the vehicle-to-home electric power feeding has been performed before the instruction regarding the vehicle-to-home electric power feeding is given in step Sf9 illustrated in FIG. 2, the server 4 may recognize that the vehicle-to-home electric power feeding is being performed based on the charge information sent in step Sf4. In this case, the server 4 may determine a situation in which the vehicle-to-home electric power feeding is being performed in step Sf5, and may refrain from performing the process of requesting the user's approval in step Sf6 and the subsequent processes. The instruction to end the vehicle-to-home electric power feeding in step Ss3 illustrated in FIG. 3 and the instruction to cancel the suppression of the charging in step Sc3 illustrated in FIG. 4 may not be performed either.

Second Example Embodiment

In the first example embodiment, the electric power company may determine whether the suppression of charging is to be canceled. However, in one example, a server 7 may determine whether the suppression of charging is to be canceled. This example will be described below as a second example embodiment. The process of the vehicle-to-home electric power feeding and the process of ending the vehicle-to-home electric power feeding in the second example embodiment may be similar to those in the first example embodiment. The electric power management system may be provided in the server 7 in the second example embodiment. The process of starting the charging of the vehicle in the second example embodiment may be different from that in the first example embodiment illustrated in FIG. 4. The server 7 may include a processor and a recording medium. In one embodiment, the "processor" of the server 7 may serve as the "processor".

As with in the first example embodiment, when the electric power shortage situation improves, the electric power company may send the request cancel notification from the electric power company system 5. The vehicle 1 and the vehicle-to-home apparatus 3 may thus end the vehicle-to-home electric power feeding and may be brought into the charging suppression state. In the second example embodiment, the electric power company system 5 may send the electric power reserve margins to the server 7 at predetermined time intervals. The server 7 may determine whether the suppression of charging is to be canceled based on the electric power reserve margin, and may send the instruction to cancel the suppression of the charging to the vehicle 1. The charging of the vehicle 1 may thus be started. As described above, in the second example embodiment, the server 7 may perform the determination regarding canceling of the suppression of charging. In one embodiment, the server 7 may serve as the "electric power management system".

Figure 5:
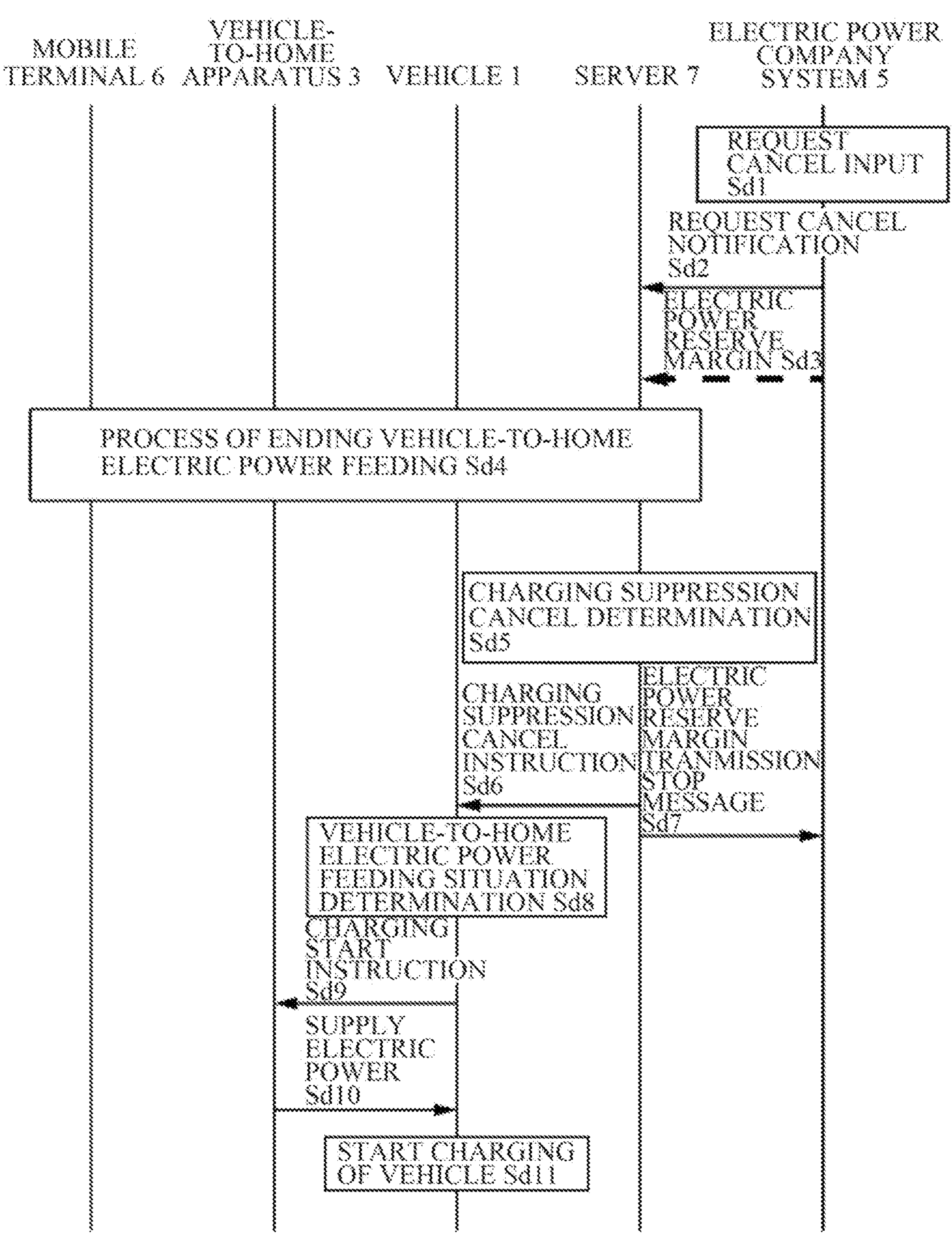
FIG. 5 is a diagram illustrating processes from canceling a request to starting charging of the vehicle according to one example embodiment.

FIG. 5 illustrates processes from canceling the electric power saving request to starting charging of the vehicle in the second example embodiment. As with the server 4 of the first example embodiment illustrated in FIG. 1, the server 7 may be coupled to both the network N and the mobile body communication system M.

When the electric power shortage situation improves from the state in which the electric power shortage warning or the electric power shortage advisory is issued, the electric power company may determine whether to cancel the electric power saving request. If the electric power company determines to cancel the request, the electric power company may supply information indicating the canceling of the request to the electric power company system 5 (step Sd1). Further, the electric power company system 5 may send an electric power saving request cancel notification to the server 7 (step Sd2). In addition, the electric power company system 5 may send the electric power reserve margins to the server 7 at the predetermined time intervals. The server 7 may acquire the electric power reserve margins at respective timings without much delay (step Sd3). In the second example embodiment, the electric power company system 5 may send the electric power reserve margins to the server 7 at the predetermined time intervals after the request cancel notification is sent in step Sd2. However, in one example, the electric power company system 5 may send the electric power reserve margins to the server 7 at the predetermined time intervals after the vehicle-to-home electric power feeding process is started, or at the predetermined time intervals from any other timing. In another example, the electric power company system 5 may substantially constantly send the electric power reserve margins to the server 7 at the predetermined time intervals.

When receiving the request cancel notification, the server 7 may perform the process of ending the vehicle-to-home electric power feeding (step Sd4). The process of ending the vehicle-to-home electric power feeding (step Sd4) may be similar to the processes in steps Ss3 to Ss10 performed among the server 4, the vehicle 1, the vehicle-to-home apparatus 3, and the mobile terminal 6 in the first example embodiment. The vehicle-to-home electric power feeding may be ended through this process, and the state of suppressing the charging of the vehicle 1 may be established.

When the process of ending the vehicle-to-home electric power feeding ends, the server 7 may perform a determination regarding canceling of the suppression of charging (step Sd5). In the determination regarding the canceling of the suppression of charging, if the electric power reserve margin is greater than or equal to a threshold while the request cancel state is established, it may be determined that the chargeable situation is established, and the charging suppression state may be to be canceled. If it is determined that the charging suppression state is to be canceled, the server 7 may send a charging suppression cancel notification to the vehicle 1 (step Sd6). Such a threshold may be a value greater than the electric power reserve margin at the time when the electric power saving request is canceled. The threshold may be set to an electric power reserve margin that does not cause the electric power reserve margin in the electric power shortage situation to be the electric power reserve margin corresponding to the electric power shortage advisory even if charging of the vehicle 1 with the electric power from the vehicle-to-home apparatus 3 is performed at many locations. In the determination regarding the canceling of the suppression of charging, before the electric power reserve margin reaches the threshold, the charging suppression cancel notification may not be sent, and the charging suppression state may be maintained.

In addition, the server 7 may send a reserve margin transmission stop message to the electric power company system 5 (step Sd7). Accordingly, the electric power company system 5 may stop sending the electric power reserve margin to the server 7. Note that a server that has not yet received the reserve margin transmission stop message may continue to send the electric power reserve margin.

When receiving the charging suppression cancel instruction, the vehicle 1 may perform the vehicle-to-home electric power feeding situation determination (step Sd8). In the vehicle-to-home electric power feeding situation determination, if the charging suppression state is established, the suppression of charging may be canceled. If the charging and feeding cable 32 is coupled to the vehicle connector 33 and charging is to be performed, the instruction to start charging may be sent to the vehicle-to-home apparatus 3 (step Sd9). The vehicle-to-home apparatus 3 having received the instruction to start charging may supply electric power to the vehicle 1 (step Sd10). In the vehicle 1 receiving the electric power supply, charging of the battery 12 may start (step Sd11).

Figure 6:
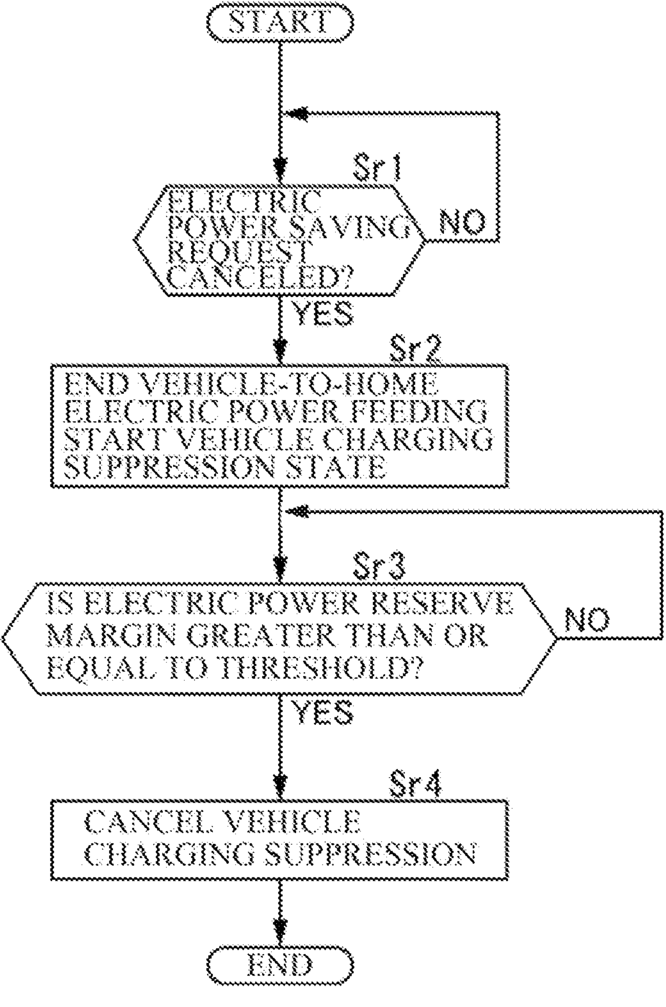
FIG. 6 is a diagram illustrating a flow of canceling suppression of the charging of the vehicle according to one example embodiment.

FIG. 6 illustrates a flow to cancel the suppression of charging of the vehicle in the second example embodiment. The flow may relate to the server 7. The server 7 may determine whether the electric power saving request is canceled (step Sr1). If the electric power saving request is not canceled (step Sr1: NO), the server 7 may perform the process in step Sr1 again. When the electric power saving request is canceled (step Sr1: YES), the process may proceed to the next step. The server 7 may give an instruction to the vehicle 1 to end the vehicle-to-home electric power feeding, and may cause the vehicle charging suppression state to start (step Sr2). Thereafter, the server 7 may determine whether the electric power reserve margin is greater than or equal to a threshold (step Sr3). Such a threshold may be a value greater than the electric power reserve margin at the time when the electric power saving request is canceled. The threshold may be set to an electric power reserve margin that does not cause the electric power reserve margin in the electric power shortage situation to be the electric power reserve margin corresponding to the electric power shortage advisory even if charging of the vehicle 1 with the electric power from the vehicle-to-home apparatus 3 is performed at many locations. If the electric power reserve margin is not greater than or equal to the threshold (step Sr3: NO), the server 7 may perform the process in step Sr3 again. If the electric power reserve margin is greater than or equal to the threshold (step Sr3: YES), the process may proceed to the next step, in which the server 7 may cancel the vehicle charging suppression state (step Sr4). The charging of the vehicle 1 with the electric power from the vehicle-to-home apparatus 3 may thus be started.

[Modifications]

In the second example embodiment, the request cancel notification may be sent in step Sd2, and thereafter, the electric power reserve margins may be sent at the predetermined intervals in step Sd3. However, in one example, the electric power company system 5 may send the electric power reserve margins to the server 7 at the predetermined time intervals, and the server 7 may determine whether to start or end the vehicle-to-home electric power feeding or whether to cancel the suppression of charging, and send an instruction or any other information to the vehicle 1 or any other apparatus or system. In this case, if the electric power reserve margin becomes less than or equal to a first predetermined value, the vehicle-to-home electric power feeding may be started. If the electric power reserve margin becomes greater than or equal to a second predetermined value, the vehicle-to-home electric power feeding may be ended. Further, if the electric power reserve margin becomes greater than or equal to a third predetermined value, the suppression of charging may be canceled and the charging of the vehicle 1 may be started. In this example, the third predetermined value may be greater than the second predetermined value. The first predetermined value may be the same as the second predetermined value.

In the first example embodiment, the second example embodiment, and the modifications, the server 4 or 7 may serve as the electric power management system. However, in one example, the vehicle 1 or the vehicle-to-home apparatus 3 may serve as the electric power management system. In another example, the vehicle 1, the vehicle-to-home apparatus 3, and the server 4 or 7 as a whole may be called an electric power management system. The program to execute each process may be executed by any one of the vehicle 1, the vehicle-to-home apparatus 3, and the server 4 or 7, or may be executed by any two or more of the vehicle 1, the vehicle-to-home apparatus 3, and the server 4 or 7 in a distributed manner. This is similarly applicable to the computer-readable recording medium containing the program.

In one example, the vehicle-to-home apparatus 3 may include a communicator to receive an instruction or a notification directly from, for example, the server 4 or 7 or the electric power company system 5. For example, the communicator may communicate via the network N or the mobile body communication system M. In communication via the network N, the communicator may communicate via Wi-Fi for home use.

In the foregoing example embodiments, the description has been provided regarding the vehicle electric power management system configured to charge a vehicle, referring to the example regarding the vehicle-to-home system that allows for vehicle-to-home electric power supply. However, one example embodiment may be, for example, a charging system using a charging apparatus that does not perform the vehicle-to-home electric power supply but simply supplies electric power to a vehicle. In such a charging system, when the electric power saving request is canceled, the charging suppression state may be established, and the electric power reserve margin may be monitored. When the chargeable situation is established in which the electric power reserve margin becomes greater than or equal to a threshold, charging may be started, or charging may be allowed to be started.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

According to one embodiment of the disclosure, it is possible to, when an electric power shortage situation improves, prevent occurrence of a situation in which an electric power supply amount increases due to starting of charging of vehicles and electric power shortage occurs again or a situation in which blackout occurs in a large region.

Each of the processor 11, the processor 41, and the processor 311 illustrated in FIG. 1, and the processor of the server 7 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the processor 11, the processor 41, and the processor 311 illustrated in FIG. 1 and the processor of the server 7. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the processor 11, the processor 41, and the processor 311 illustrated in FIG. 1 and the processor of the server 7.

The invention claimed is:

1. An electric power management system comprising a processor configured to:

in response to cancellation of a request for cooperation in electric power saving issued because of an electric power shortage situation, end electric power feeding from a vehicle to a vehicle-to-home apparatus, and start a charging suppression state in which charging of a battery of the vehicle with electric power from the vehicle-to-home apparatus is not performed; and when an electric power reserve margin becomes greater than or equal to a threshold after the cancellation of the request, end the charging suppression state and start charging of the battery of the vehicle with electric power from the vehicle-to-home apparatus.

2. The electric power management system according to claim 1, wherein the electric power management system is provided in a server communicable with the vehicle.

3. The electric power management system according to claim 1, wherein the processor is provided in the vehicle.

4. The electric power management system according to claim 1, wherein the processor is provided in the vehicle-to-home apparatus.

5. The electric power management system according to claim 1, wherein the processor is provided in a mobile terminal.

6. A non-transitory tangible computer-readable recording medium containing a program, the program causing, when executed by a computer, the computer to implement a method, the method comprising:

in response to cancellation of a request for cooperation in electric power saving issued because of an electric power shortage situation, ending electric power feeding from a vehicle to a vehicle-to-home apparatus, and starting a charging suppression state in which charging of a battery of the vehicle with electric power from the vehicle-to-home apparatus is not performed; and when an electric power reserve margin becomes greater than or equal to a threshold after the cancellation of the request, ending the charging suppression state and starting charging of the battery of the vehicle with electric power from the vehicle-to-home apparatus.

7. The electric power management system according to claim 1, wherein the threshold is greater than an electric power reserve margin at a time when the request is canceled.

8. The electric power management system according to claim 7, wherein the threshold is set to an electric power reserve margin that does not cause the electric power reserve margin in the electric power shortage situation to be the electric power reserve margin corresponding to an electric power shortage advisory even if charging of the vehicle with the electric power from the vehicle-to-home apparatus is performed at many locations.

9. The electric power management system according to claim 1, wherein, before the electric power reserve margin reaches the threshold after the cancellation, the charging suppression state is maintained.

10. An electric power management system comprising a processor configured to:

receive, from an electric power company system, information indicating an electric power reserve margin at predetermined time intervals;

start execution of first process for supplying electric power from a vehicle to a vehicle-to-home apparatus in response to the electric power reserve margin indicated by the received information becoming less than or equal to a first threshold;

during execution of the first process, start execution of second process in response to the electric power reserve margin indicated by the received information becomes greater than or equal to a second threshold that is greater than the first threshold, wherein the second process includes (i) stopping the execution of the first process to end supply of the electric power from the vehicle to the vehicle-to-home apparatus, and (ii) prohibiting supply of electric power from the vehicle-to-home apparatus to the vehicle for charging a battery of the vehicle; and during execution of the second process, in response to the electric power reserve margin indicated by the received information becomes greater than or equal to a third threshold that is greater than the second threshold, stop execution of the second process and permit supply of the electric power from the vehicle-to-home apparatus to the vehicle for charging the battery.

* * * * *